United States Patent
Kim et al.

(10) Patent No.: US 9,320,046 B2
(45) Date of Patent: *Apr. 19, 2016

(54) REFERENCE SIGNAL MEASUREMENT METHOD AND APPARATUS FOR USE IN WIRELESS COMMUNICATION SYSTEM INCLUDING PLURAL BASE STATIONS WITH DISTRIBUTED ANTENNAS

(71) Applicant: Samsung Electronics Co., Ltd., Suwon-si, Gyeonggi-do (KR)

(72) Inventors: Younsun Kim, Seongnam-si (KR); Youngbum Kim, Seoul (KR); Juho Lee, Suwon-si (KR); Hyojin Lee, Suwon-si (KR); Joonyoung Cho, Suwon-si (KR); Hyoungju Ji, Seoul (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,971

(22) Filed: Apr. 20, 2015

(65) Prior Publication Data
US 2015/0230260 A1  Aug. 13, 2015

Related U.S. Application Data

(63) Continuation of application No. 13/899,163, filed on May 21, 2013, now Pat. No. 9,014,043.

(30) Foreign Application Priority Data

May 22, 2012 (KR) .................. 10-2012-0054112
Jun. 21, 2012 (KR) .................. 10-2012-0066676
Jun. 26, 2012 (KR) .................. 10-2012-0068479

(51) Int. Cl.
*H04W 24/00* (2009.01)
*H04W 80/04* (2009.01)
(Continued)

(52) U.S. Cl.
CPC .............. *H04W 72/082* (2013.01); *H04B 7/04* (2013.01); *H04B 7/0417* (2013.01); *H04W 24/10* (2013.01);
(Continued)

(58) Field of Classification Search
CPC ..... H04W 24/00; H04W 80/04; H04W 72/04; H04W 88/08
See application file for complete search history.

(56) References Cited

U.S. PATENT DOCUMENTS

2011/0243079 A1  10/2011  Chen et al.
2012/0140743 A1   6/2012  Pelletier et al.
(Continued)

OTHER PUBLICATIONS

3GPP TSG-RAN WG1 #63bis, Remaining Details of Feedback for TM9, Jan. 17-21, 2011, R1-110338, Qualcomm Incorporated, Dublin, Ireland.
(Continued)

*Primary Examiner* — Andrew Lee
(74) *Attorney, Agent, or Firm* — Jefferson IP Law, LLP

(57) ABSTRACT

An apparatus and a method of measuring a reference signal for efficient downlink transmission in a mobile communication system are provided. The system includes plural base stations, each having a plurality of antennas distributed in the service area thereof based on a Distributed Antenna System (DAS). A method for a base station to notify a terminal of reference signal measurement information in a mobile communication system comprises determining whether the terminal is in a Rank Indicator/Precoding Matrix Indicator (RI/PMI) disabled mode, selecting, when the terminal is in the RI/PMI disabled mode, the reference signal to be measured by the terminal between a Cell-specific Reference Signal (CRS) and a Channel Status Information Reference Signal (CSI-RS), notifying the terminal of the reference signal measurement information with the selection result, and receiving channel information generated based on the reference signal measurement information from the terminal.

20 Claims, 13 Drawing Sheets

(51) Int. Cl.
*H04W 72/08* (2009.01)
*H04W 24/10* (2009.01)
*H04B 7/04* (2006.01)
*H04W 72/04* (2009.01)
*H04B 7/02* (2006.01)
*H04B 7/06* (2006.01)

(52) U.S. Cl.
CPC .............. *H04W 72/042* (2013.01); *H04B 7/022* (2013.01); *H04B 7/063* (2013.01); *H04B 7/0632* (2013.01); *H04B 7/0639* (2013.01); *H04B 7/0645* (2013.01)

(56) References Cited

U.S. PATENT DOCUMENTS

| | | |
|---|---|---|
| 2012/0170525 A1 | 7/2012 | Sorrentino |
| 2012/0207126 A1 | 8/2012 | Qu et al. |
| 2012/0220286 A1 | 8/2012 | Chen et al. |
| 2013/0007560 A1 | 1/2013 | Subashchandrabose et al. |
| 2013/0114562 A1 | 5/2013 | Seo et al. |
| 2013/0301560 A1 | 11/2013 | Geirhofer et al. |
| 2014/0098694 A1 | 4/2014 | Damji et al. |
| 2014/0233665 A1 | 8/2014 | Clevorn et al. |
| 2014/0321406 A1* | 10/2014 | Marinier et al. .............. 370/329 |
| 2015/0055584 A1* | 2/2015 | Lee et al. .................... 370/329 |

OTHER PUBLICATIONS

3GPP TSG RAN WG1 Meeting #63bis, Views on Supporting PMI Disabling in TM9, Jan. 17-21, 2011, R1-110285, Research in Motion, UK Limited, Dublin, Ireland.

3GPP TSG-RAN WG2 Meeting #78, General Framework and Principles for Configuration of CSI-RS Based Received Signal Quality Measurement, May 21-25, 2012, R2-122135, Huawei, HiSilicon, Prague, Czech Republic.

3GPP TSG-RAN WG1 #69, Discussion on Rank Indicator (RI) Report for CoMP, May 21-25, 2012, R1-122631, Intel Corporation, Prague, Czech.

3GPP TSG-RAN WG1 Meeting #69, Downlink Control Signaling for CoMP, May 21-25, 2012, R1-122143, ZTE, Prague, Czech Republic.

Nokia Siemens Networks, " CQI definition for CoMP support in Rel-11", 3GPP TSG RAN WG1 Meeting #68, R1-120721, Feb. 6-10, 2012, Dresden, Germany.

* cited by examiner

REFERENCE SIGNAL MEASUREMENT METHOD AND APPARATUS FOR USE IN WIRELESS COMMUNICATION SYSTEM INCLUDING PLURAL BASE STATIONS WITH DISTRIBUTED ANTENNAS

PRIORITY

This application is a continuation application of a prior application Ser. No. 13/899,163, filed on May 21, 2013, which claims the benefit under 35 U.S.C §119(a) of a Korean patent application filed on May 22, 2012 in the Korean Intellectual Property Office and assigned Serial No. 10-2012-0054112, a Korean patent application filed on Jun. 21, 2012 and assigned Serial No. 10-2012-0066676, and a Korean patent application filed on Jun. 26, 2012 and assigned Serial No. 10-2012-0068479, the entire disclosure of each of which is hereby incorporated by reference.

BACKGROUND OF THE INVENTION

1. Field of the Invention

The present invention relates to a reference signal measurement method and an apparatus for use in a wireless communication system including plural base stations with distributed antennas. More particularly, the present invention relates to a reference signal measurement method of a terminal for efficient downlink transmission in a mobile communication system including plural base stations, each having a plurality of antennas distributed in the service area thereof based on a Distributed Antenna System (DAS).

2. Description of the Related Art

Mobile communication systems have evolved into high-speed, high-quality wireless packet data communication systems that provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in the 3rd Generation Partnership Project (3GPP), High Rate Packet Data (HRPD) defined in the 3rd Generation Partnership Project-2 (3GPP2), and 802.16 defined by the Institute of Electrical and Electronics Engineers (IEEE), have been developed to support the high-speed, high-quality wireless packet data communication services. More particularly, LTE is a communication standard developed to support a high speed packet data transmission and to maximize the throughput of the radio communication system with various radio access technologies. LTE-A is the evolved version of LTE to improve the data transmission capability.

LTE is characterized by 3GPP Release 8 or 9 capable base station and terminal (i.e., a user equipment) while LTE-A is characterized by 3GPP Release 10 capable base station and user equipment. As a key standardization organization, 3GPP continues standardization of the next release for more improved performance beyond LTE-A.

The 3rd and 4th generation wireless packet data communication systems of the related art (such as HSDPA, HSUPA, HRPD, and LTE/LTE-A) adopt Adaptive Modulation and Coding (AMC) and Channel-Sensitive Scheduling techniques to improve the transmission efficiency. AMC allows the transmitter to adjust the data amount to be transmitted according to the channel condition. For example, the transmitter is capable of decreasing the data transmission amount for bad channel condition so as to fix the received signal error probability at a certain level or increasing the data transmission amount for good channel condition so as to transmit large amount of information efficiently while maintaining the received signal error probability at an intended level. Meanwhile, the channel sensitive scheduling allows the transmitter to serve the user having a good channel condition selectively among a plurality of users so as to increase the system capacity as compared to allocating a channel fixedly to serve a single user. This increase in system capacity is referred to as a multi-user diversity gain. In brief, the AMC method and the channel-sensitive scheduling method are methods for receiving partial channel state information being fed back from a receiver, and for applying an appropriate modulation and coding technique at the most efficient time determined depending on the received partial channel state information.

In a case of using AMC along with a Multiple Input Multiple Output (MIMO) transmission scheme, it may be necessary to take a number of spatial layers and ranks for transmitting signals in to consideration. In this case, the transmitter determines the optimal data rate in consideration of the number of layers for use in a MIMO transmission.

Recently, many researches are being conducted to replace Code Division Multiple Access (CDMA) used in the legacy 2nd and 3rd mobile communication systems with Orthogonal Frequency Division Multiple Access (OFDMA) for the next generation mobile communication system. The 3GPP and 3GPP2 are in the middle of the standardization of an OFDMA-based evolved system. OFDMA is expected to provide superior system throughput as compared to CDMA. One of the main factors that allow OFDMA to increase system throughput is the frequency domain scheduling capability. As channel sensitive scheduling increases the system capacity using the time-varying channel characteristic, Orthogonal Frequency Division Multiplexing (OFDM) can be used to obtain more capacity gain using the frequency-varying channel characteristic.

FIG. 1 is a graph illustrating a relationship between time and frequency resources in an LTE/LTE-A system according to the related art.

Referring to FIG. 1, the radio resource for transmission from the evolved Node B (eNB) to a User Equipment (UE) is divided into Resource Blocks (RBs) in the frequency domain and subframes in the time domain. In the LTE/LTE-A system, an RB consists of 12 consecutive carriers and occupies 180 kHz bandwidth.

Meanwhile, a subframe consists of 14 OFDM symbols and spans 1 msec. The LTE/LTE-A system allocates resources for scheduling in unit subframe in the time domain and in unit of RB in the frequency domain.

FIG. 2 is a time-frequency grid illustrating a single resource block of a downlink subframe as a smallest scheduling unit in an LTE/LTE-A system according to the related art.

Referring to FIG. 2, the radio resource is of one subframe in the time domain and one RB in the frequency domain. The radio resource consists of 12 subcarriers in the frequency domain and 14 OFDM symbols in the time domain, i.e., 168 unique frequency-time positions. In LTE/LTE-A, each frequency-time position is referred to as a Resource Element (RE).

The radio resource structured as shown in FIG. 2 can be used for transmitting plural different types of signals as follows:

Cell-specific Reference Signal (CRS): a reference signal transmitted to all the UEs within a cell, Demodulation Reference Signal (DMRS): a reference signal transmitted to a specific UE, Physical Downlink Shared Channel (PDSCH): a data channel transmitted in downlink which the eNB uses to transmit data to the UE and mapped to REs not used for reference signal transmission in data region of FIG. 2, Channel Status Information Reference Signal (CSI-RS): a reference signal transmitted to the UEs within a cell and used for channel state measurement. Multiple CSI-RSs can be transmitted within a cell, and Other control channels (such as a Physical Hybrid Automatic Repeat reQuest (ARQ) Indicator Channel (PHICH), a Physical Control Format Indicator Channel (PCFICH), a Physical Downlink Control Channel (PDCCH)): channels for providing control channel necessary for the UE to receive PDCCH and transmitting ACKnowledgement/Non-ACK (ACK/NACK) of Hybrid ARQ (HARQ) operation for uplink data transmission.

In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS, and the UE receives the traffic signal skipping the corresponding radio resource. In the LTE-A system, the zero power CSI-RS is referred to as muting. The zero power CSI-RS (muting) by nature is mapped to the CSI-RS position without transmission power allocation.

In FIG. 2, the CSI-RS can be transmitted at some of the positions marked by A, B, C, D, E, F, G, H, I, and J according to the number of antennas transmitting CSI-RS. In addition, the zero power CSI-RS (muting) can be mapped to some of the positions A, B, C, D, E, F, G, H, I, and J. The CSI-RS can be mapped to 2, 4, or 8 REs according to the number of the antenna ports for transmission.

For two antenna ports, half of a specific pattern is used for CSI-RS transmission, for four antenna ports, an entirety of the specific pattern is used for CSI-RS transmission, and for eight antenna ports, two patterns are used for CSI-RS transmission.

Meanwhile, muting is always performed by pattern. For example, although the muting may be applied to plural patterns, if the muting positions mismatch CSI-RS positions, it cannot be applied to one pattern partially.

In the case of transmitting CSI-RSs of two antenna ports, the CSI-RSs are mapped to two consecutive REs in the time domain and distinguished from each other using orthogonal codes. In the case of transmitting CSI-RSs of four antenna ports, the CSI-RSs are mapped in the same way of mapping the two more CSI-RSs to two more consecutive REs. This is applied to the case of transmitting CSI-RSs of eight antenna ports.

In a cellular system, the reference signal has to be transmitted for downlink channel state measurement. In the case of the 3GPP LTE-A system, the UE measures the channel state with the eNB using the CSI-RS transmitted by the eNB.

The channel state is measured in consideration of a few factors including downlink interference. The downlink interference includes the interference caused by the antennas of neighbor eNBs and thermal noise that are important in determining the downlink channel condition. For example, in the case that the eNB with one transmit antenna transmits the reference signal to the UE with one receive antenna, the UE has to determine the amount of energy per symbol that can be received in downlink and the amount of interference that may be received for the duration of receiving the corresponding symbol to calculate Es/Io from the received reference signal. The calculated Es/Io is reported to the eNB such that the eNB determines the downlink data rate for the UE.

In the typical mobile communication system, the base station apparatus is positioned at the center of each cell and communicates with the UE using one or more antennas deployed at a restricted position. Such a mobile communication system implemented with the antennas deployed at the same position within the cell is referred to as a Centralized Antenna System (CAS). In contrast, the mobile communication system implemented with plural Remote Radio Heads (RRHs) belonging to a cell are distributed within the cell area is referred to as the DAS.

FIG. 3 is a diagram illustrating an antenna arrangement in a distributed antenna system according to the related art.

Referring to FIG. 3, there are distributed antenna system-based cells 300 and 310. The cell 300 includes five transmission points including one high power transmission position 320 and four low power transmission positions 340, 350, 360, and 370. In this case, each transmission point may be provided with one or more transmit antennas.

The high power transmission point is capable of providing at least minimum service within the coverage area of the cell while the distributed low power transmission points are capable of providing UEs with the high data rate service within a restricted area. The low and high power transmission points are all connected to a central controller 330 so as to operate according to the scheduling and radio resource allocation of the central controller 330.

In the distributed antenna system, one or more antennas can be deployed at one geometrically separated antenna position. In the present invention, the antenna(s) deployed at the same position is referred to as an RRH. In the distributed antenna system depicted in FIG. 3, the UE receives signals from one geometrically distributed transmission point and regards the signals from others as interference.

In the distributed antenna system of FIG. 3, all antennas of one cell participate in the CRS transmission. For example, all the antennas of the cell transmit the CRS simultaneously or mute at the REs on which the CRSs of other antennas are mapped to avoid interference. In the case that all the antennas of one cell transmit the CRS, the data signal transmission based on the CRS is performed through all the antennas of the cell.

Meanwhile, in a case which some antennas of the cell participate in the CRS transmission, the other antennas not participated in the CRS transmission mute transmission at the REs on which the CRS is mapped to avoiding interference to the CRS transmitted through other antennas. In this, the data signal transmission based on the CRS is also performed through antennas participating in CRS transmission.

In the case of CSI-RS, the antennas of one cell may transmit different CSI-RSs. For example, although the same CRS is transmitted through the transmission points 320, 340, 350, 360, and 370, the different CSI-RSs may be transmitted through the transmission points 320, 340, 350, 360, and 370. In order for the transmission points to transmit different CSI-RSs, it can be considered to map the CSI-RSs to different CSI-RS transmission resource positions in the grid of FIG. 2 or applying different scrambling codes to the CSI-RS transmission resource positions.

In the LTE-A system, the UE feeds back the information on the downlink channel state for use in downlink scheduling of the eNB. For example, the UE measures the reference signal transmitted by the eNB in downlink and feeds back the information estimated from the reference signal to the eNB in the format defined in LTE/LTE-A standard. In LTE/LTE-A, the UE feedback information includes the following three indicators:

Rank Indicator (RI): number of spatial layers that can be supported by the current channel experienced at the UE, Precoding Matrix Indicator (PMI): precoding matrix recommended by the current channel experienced at the UE, and Channel Quality Indicator (CQI): maximum possible data rate at which the UE can receive a signal in the current channel state. CQI may be replaced with the Signal to Interference plus Noise Ratio (SINR), maximum error correction code rate and modulation scheme, or per-frequency data efficiency that can be used in a similar way to the maximum data rate.

The RI, PMI, and CQI are associated among each other in meaning. For example, the precoding matrix supported in LTE/LTE-A is configured differently per rank. Accordingly, the PMI value 'X' is interpreted differently for the cases of RI set to 1 and RI set to 2. In addition, when determining CQI, the UE assumes that the PMI and RI which it has reported is applied by the eNB. For example, if the UE reports RI_X, PMI_Y, and CQI_Z, this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

In LTE/LTE-A, the RI and PMI disabled mode (hereinafter, RI/PMI disabled mode) in which only CQI is fed back without RI and PMI is supported. The UE operating in RI/PMI disabled mode feeds back only CQI without RI and PMI.

FIG. 4 is a diagram illustrating feedback patterns in an RI/PMI enabled mode and an RI/PMI disabled mode of the UE according to the related art.

Referring to FIG. 4, the UE transmits RI, PMI, and CQI in the RI/PMI enabled mode as follows:

transmit RI at timings 400 and 430
transmit PMI at timings 410 and 440
transmit CQI at timings 420 and 450

When the RI/PMI is in a disabled state, the UE does not transmit RI and PMI but transmits only CQI at timings 460 and 470. The reason for disabling RI and PMI transmission is to decrease the feedback overhead, resulting in improvement of uplink system throughput and reduction of UE's battery consumption.

In the LTE/LTE-A system, the UE operating in RI/PMI disabled mode, the UE always measures CRS to generate CQI.

As described above, the UE generates CQI under the assumption of a specific transmission mode. In the LTE/LTE-A system, the UE operating in RI/PMI disabled mode generates CQI under the assumption that the eNB applies Space Frequency Block Code (SFBC) precoding when it uses two transmit antenna. In the case that the eNB uses four transmit antennas, the UE generates CQI under the assumption that Frequency Shift Time Diversity (FSTD) precoding is applied.

In the LTE/LTE-A system, the CRS measurement-based CQI generation method of the UE operating in the RI/PMI disabled mode has two problems.

First, the CRS measurement-based method is not appropriated for the distributed antenna system as shown in FIG. 3. Since the CRS is transmitted through plural transmission points within one cell, the CQI acquired based on the CRS measurement is applicable only when the PDSCH is transmitted from all the transmission points of the cell to one UE simultaneously. Typically, PDSCH transmission is performed only through the transmission point closest to the UE in the distributed antenna system. In the case of transmitting the PDSCH through the closest transmission point, other transmission points may transmit PDSCH to other UEs, resulting in improvement of system throughput. In order to generate accurate CQI on downlink channel per transmission point in the distributed antenna system, it is required to measure CSI-RS other than CRS.

Secondly, CRS supports up to 4 transmit antennas. Accordingly, although it is possible to apply aforementioned SFBC or FSTD precoding to 2 or 4 CRS antennas per transmission point, each transmission point of the distributed antenna system may use up to 8 antennas. Since there is no precoding scheme defined for the case that each transmission point has 8 antennas, CRS cannot be used in this case. In addition, since SFBC and FSTD precodings are defined in consideration of only CRS, it is difficult to apply the precodings for the CSI-RS.

In the related art, the above problem can be addressed in such a way that the UE operating in RI/PMI disabled mode generates the CQI based on the CSI-RS measurement.

However, the problem caused by the CRS measurement is not the problem occurring always but when the distributed antenna system is introduced in the LTE/LTE-A mobile communication system of the related art. For example, if the distributed antenna system is not applied, it may be advantageous to generate CQI based on CRS measurement in the RI/PMI disabled mode. However, it has no capability to determine whether the distributed antenna system is configured, the UE cannot measure the CRS and CSI-RS selectively.

Therefore, a need exists for a reference signal measurement method and an apparatus for use in a wireless communication system including plural base stations with distributed antennas.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting a reference signal for use in generating accurate Channel Quality Indicator (CQI) from an evolved Node B (eNB) to a User Equipment (UE) operating in a Rank Indicator/Precoding Matrix Indicator (RI/PMI) mode in a Distributed Antenna System (DAS)-based Long Term Evolution (LTE) system. In an exemplary embodiment of the present invention, a transmission mode of the eNB which is assumed by the UE for generating CQI in the RI/PMI disabled mode.

In accordance with an aspect of the present invention, a method for a base station to notify a terminal of reference signal measurement information in a mobile communication system including a plurality of base stations having distributed antennas is provided. The method includes determining whether the terminal is in an RI/PMI disabled mode, selecting, when the terminal is in the RI/PMI disabled mode, the reference signal to be measured by the terminal between a Cell-specific Reference Signal (CRS) and a Channel Status Information Reference Signal (CSI-RS), notifying the terminal of the reference signal measurement information with the selection result, and receiving channel information generated based on the reference signal measurement information from the terminal.

In accordance with another aspect of the present invention, a downlink measurement method of a terminal in a mobile communication system including a plurality of base stations having distributed antennas is provided. The method includes receiving information on an RI/PMI disabled mode for the terminal from a base station, receiving, when the terminal is in the RI/PMI disabled mode, reference signal measurement information indicating one of a CRS and a CSI-RS, generating channel information based on the reference signal measured according to an indication of the reference signal measurement information, and reporting the channel information to the base station.

In accordance with another aspect of the present invention, a base station for notifying a terminal of reference signal measurement information in a mobile communication system including a plurality of base stations having distributed antennas is provided. The base station includes a transceiver configured to transmit the reference signal measurement information and data to the terminal and receives channel measurement information from the terminal, and a controller configured to control determining whether the terminal is in an RI/PMI disabled mode, selecting, when the terminal is in the RI/PMI disabled mode, the reference signal to be measured by the terminal between a CRS and a CSI-RS, notifying the terminal of the reference signal measurement information with the selection result, and receiving channel information generated based on the reference signal measurement information from the terminal.

In accordance with still another aspect of the present invention, a terminal for reporting downlink channel information in a mobile communication system including a plurality of base stations having distributed antennas is provided. The terminal includes a transceiver configured to receive reference signal measurement information and data transmitted by a base station, and a controller configured to control receiving information on an RI/PMI disabled mode for the terminal from a base station, receiving, when the terminal is in the RI/PMI disabled mode, reference signal measurement information indicating one of a CRS and a CSI-RS, generating channel information based on the reference signal measured according to an indication of the reference signal measurement information, and reporting the channel information to the base station.

The reference signal measurement method and apparatus of the present invention is capable of notifying the UE operating in RI/PMI disabled mode of the reference signal to be measured for generating the CQI, whereby the UE feeding back more accurate channel quality information to the eNB as compared to the system of the related art.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the description is directed to an Orthogonal Frequency Division Multiplexing (OFDM)-based radio communication system, particularly the 3rd Generation Partnership Project (3GPP) Evolved Universal Terrestrial Radio Access (EUTRA), it will be understood by those skilled in the art that exemplary embodiments of the present invention can be applied even to other communication systems having the similar technical background and channel format, with a slight modification, without departing from the spirit and scope of the present invention.

Figure 1:
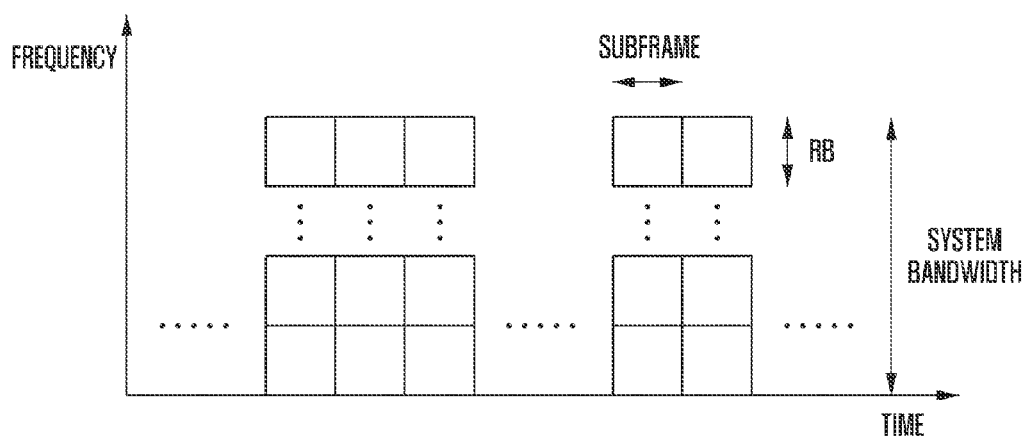
FIG. 1 is a graph illustrating a relationship between time and frequency resources in a Long Term Evolution (LTE)/LTE-Advanced (LTE-A) system according to the related art.
Figure 2:
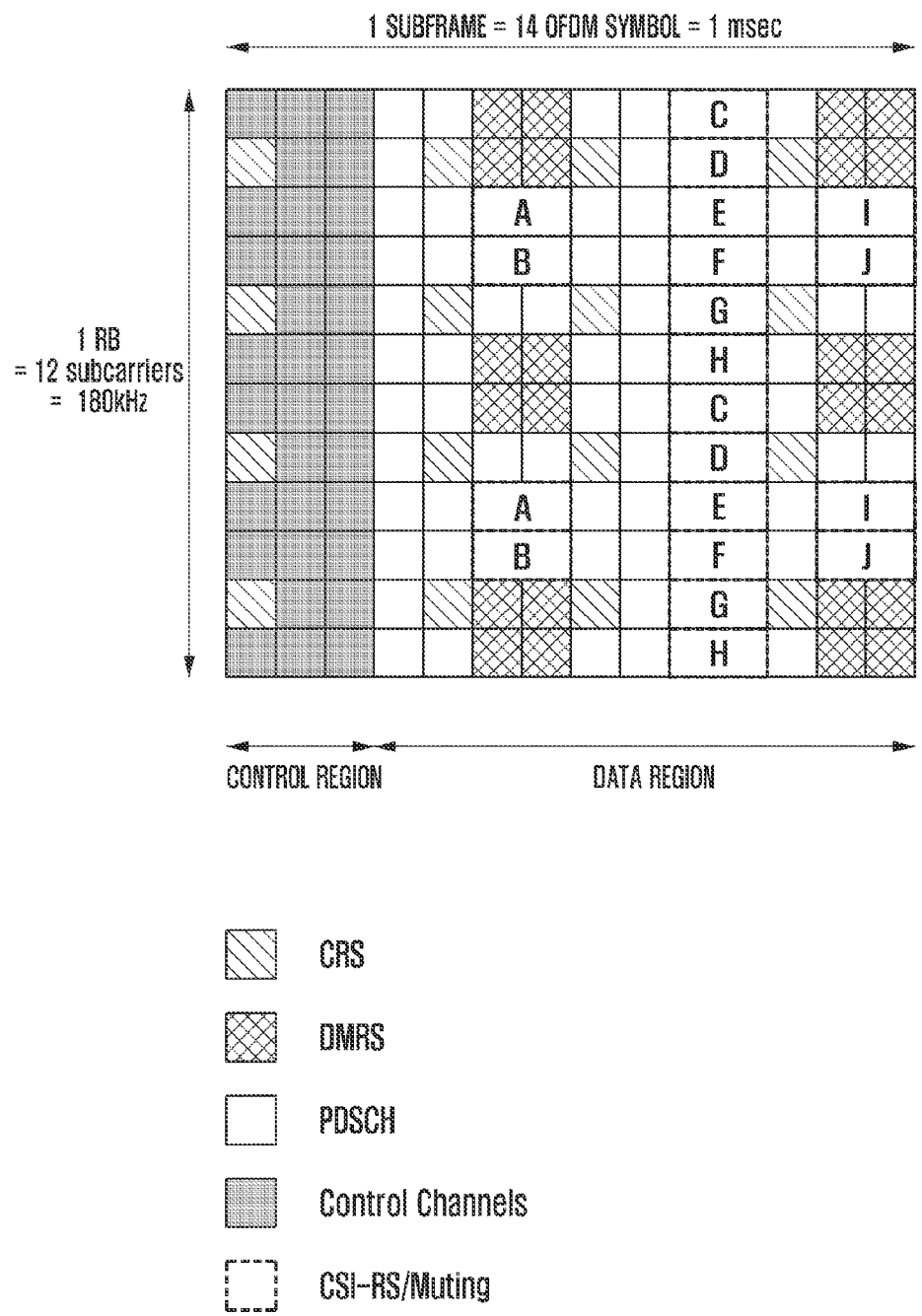
FIG. 2 is a time-frequency grid illustrating a single resource block of a downlink subframe as a smallest scheduling unit in an LTE/LTE-A system according to the related art.
Figure 3:
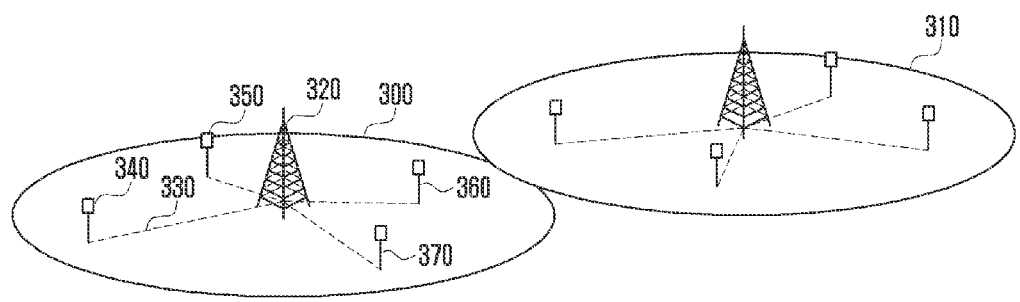
FIG. 3 is a diagram illustrating an antenna arrangement in a distributed antenna system according to the related art.
Figure 4:
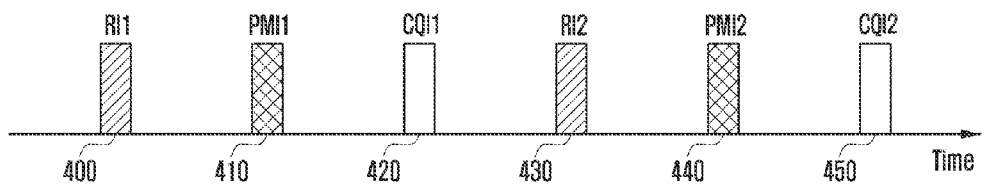
FIG. 4 is a diagram illustrating feedback patterns in a Rank Indicator/Precoding Matrix Indicator (RI/PMI) enabled mode and an RI/PMI disabled mode of a User Equipment (UE) according to the related art.
Figure 4:
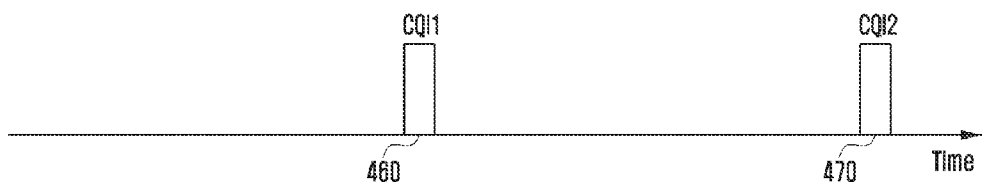
Figure 5:
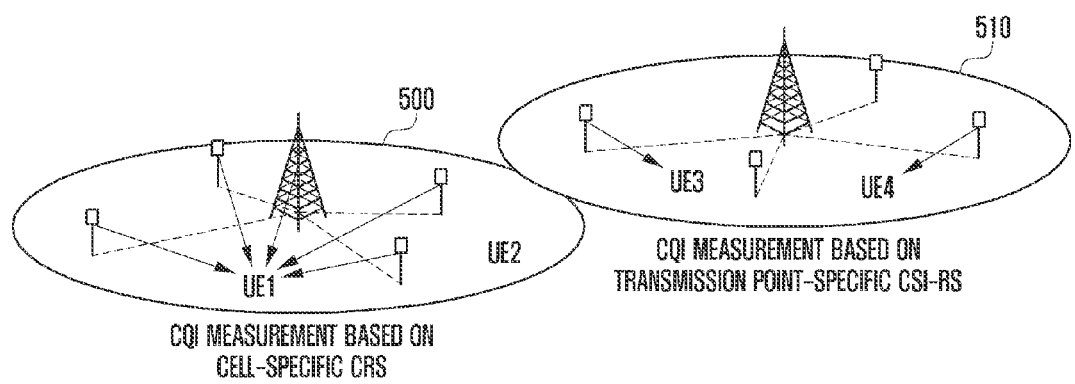
FIG. 5 is a diagram illustrating a network deployment for explaining a Cell-specific Reference Signal (CRS) measurement-based and a Channel Status Information Reference Signal (CSI-RS) measurement-based Channel Quality Indicator (CQI) generation concepts comparatively according to an exemplary embodiment of the present invention.

FIG. 5 is a diagram illustrating a network deployment for explaining Cell-specific Reference Signal (CRS) measurement-based and Channel Status Information Reference Signal (CSI-RS) measurement-based Channel Quality Indicator (CQI) generation concepts comparatively according to an exemplary embodiment of the present invention.

Referring to FIG. 5, a User Equipment 1 (UE1) measures CRS to generate CQI in a cell 500. Since CRS is the reference signal transmitted through all transmission points within the cell simultaneously, in order for the UE to generate CQI based on the CRS measurement, a Physical Downlink Shared Channel (PDSCH) corresponding to the CQI also as to be transmitted through all transmission points. For example, if the PDSCH transmission is limited to specific transmission points within the cell in a situation that PDSCH is transmitted by referencing the CQI acquired based on the CRS measurement as shown in FIG. 5, this may not guarantee the PDSCH reception performance.

Figure 6:
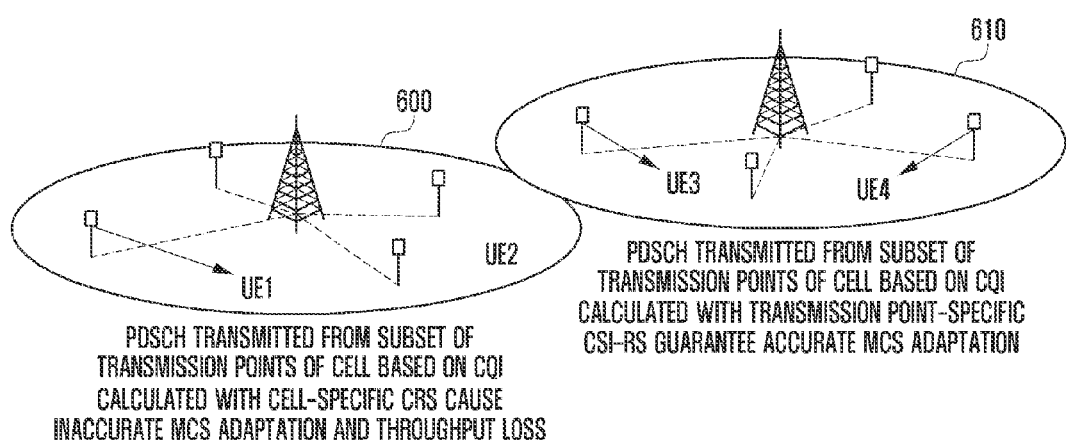
FIG. 6 is a diagram illustrating a network deployment for explaining incorrect CQI problem caused when measuring CQI based on a CRS in a distributed antenna system according to an exemplary embodiment of the present invention.

FIG. 6 is a diagram illustrating a network deployment for explaining incorrect CQI problem caused when measuring CQI based on a CRS in a distributed antenna system according to an exemplary embodiment of the present invention.

Referring to FIG. 6, the UE1 measures CRS as in FIG. 5 to generate CQI and reports the CQI to an evolved Node B (eNB) in a cell 600. Meanwhile, PDSCH is received from one transmission point. As shown in FIG. 6, in the case of generating CQI based on the CRS measurement and receiving a Physical Downlink Control Channel (PDCCH) through one transmission point in the distributed antenna system, the CQI reported to the eNB does not reflect the radio channel state between the transmission point sending PDCCH and the UE accurately, resulting in degradation of performance.

In contrast, since the UE 3 and UE 4 in a cell 610 of FIG. 6 generate the CQI based on the CSI-RS measured per transmission points other than CRS, the CQI reported to the eNB reflects the radio channel states between the transmission points and the UEs accurately.

An exemplary embodiment of the present invention provides a method for measuring CSI-RS per transmission point in a cell 510 of FIG. 5 where the UE operates in a Rank Indicator/Precoding Matrix Indicator (RI/PMI) disabled mode in the distributed antenna system. As described above, it is advantageous for the UE operating in the RI/PMI disabled mode to select one of CRS and CSI-RS depending on whether the serving cell of the UE is configured in the distributed antenna system from the viewpoint of throughput.

An exemplary embodiment of the present invention proposes a method for the eNB to notify the UE operating in the RI/PMI disabled mode of the reference signal to be used for generating CQI between CRS and CSI-RS. The notification may be performed explicitly or implicitly. A description thereon is made hereinafter or in the corresponding section.

According to an exemplary embodiment of the present invention, the explicit reference signal type notification method is implemented with the control information referred to as 'RS_Switch bit' (hereinafter, the term 'reference signal measurement information' is used interchangeable with 'RS_Switch bit').

According to the value of an RS_Switch bit, the UE operating in the RI/PMI disabled mode measures one of CRS or CSI-RS to generate CQI. For example, the UE operating in the RI/PMI disabled mode measures CRS for the RS_Switch bit set to 0 and CSI-RS for the RS_Switch bit set to 1 to generate CQI. This method can be applied to the Transmission Mode 9 (TM9) supported in Release 10 or later LTE/LTE-A system or other transmission modes to be added afterward.

Figure 7:
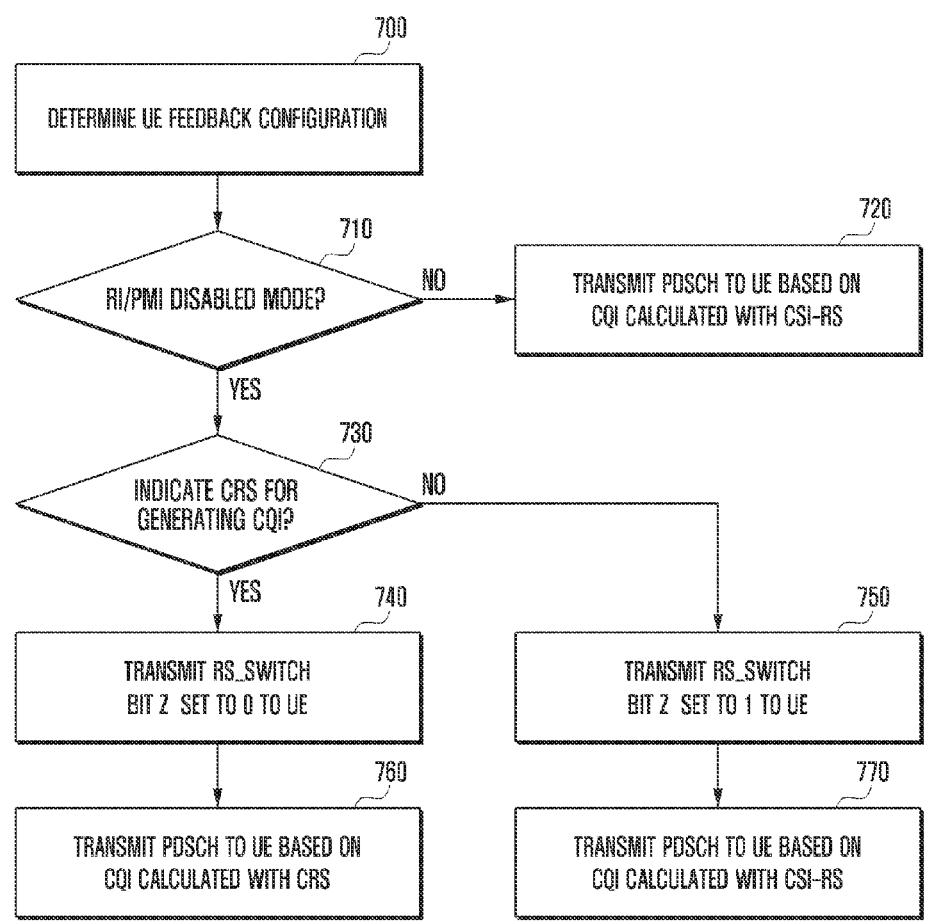
FIG. 7 is a flowchart illustrating a reference signal measurement information transmission procedure of a UE operating in an RI/PMI disabled mode in a distributed antenna system according to an exemplary embodiment of the present invention.

FIG. 7 is a flowchart illustrating a reference signal measurement information transmission procedure of a UE operating in an RI/PMI disabled mode in a distributed antenna system according to an exemplary embodiment of the present invention.

Referring to FIG. 7, the eNB determines the reference signal to be used for generating CQI at step 700. Thereafter, the eNB determines whether the UE is operating in the RI/PMI disabled mode at step 710.

If it is determined at step 710 that the UE is operating in the RI/PMI enabled mode, the eNB transmits PDSCH by referencing CQI (including RI and PMI) generated based on the CSI-RS at step 720. In order to accomplish this, according to an exemplary embodiment of the present invention, the eNB instructs the UE to measure CSI-RS in configuring RI/PMI report of the UE and receives a second type channel information generated based on CSI-RS. The eNB is capable of transmitting data, i.e., PDSCH, to the UE based on the second type channel information.

If it is determined at step 710 that the UE is operating in the RI/PMI disable mode, the eNB determines whether to configure the reference signal measurement information to indicate CRS or CSI-RS as the reference signal to be used for generating CQI at step 730.

If it is determined to configure the reference signal measurement information (RS_Switch bit) to indicate CRS, the eNB sets the RS_Switch bit to 0 and transmits the reference signal measurement information to the UE at step 740. Thereafter, the eNB transmits PDSCH by referencing the CQI generated, at the UE, based on CRS at step 760.

Otherwise, if it is determined at step 760 to configure the reference signal measurement information (RS_Switch bit) to indicate CSI-RS, the eNB sets the RS_Switch bit to 1 and transmits the reference signal measurement information to the UE at step 750. The eNB then transmits PDSCH by referencing the CQI generated, at the UE, based on the CSI-RS at step 770.

For reference, the CQI generated, at the UE, based on the reference signal indicated by the eNB is referred to as first type channel information.

Figure 8:
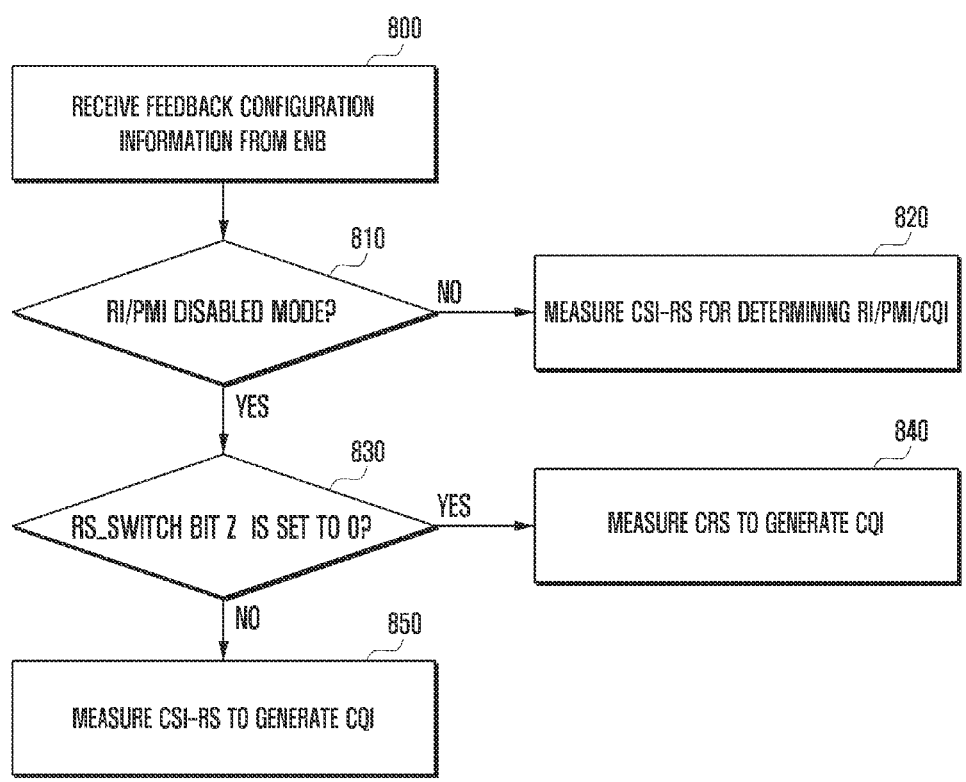
FIG. 8 is a flowchart illustrating a reference signal measurement procedure of a UE operating in an RI/PMI disabled mode based on reference signal measurement information transmitted by an evolved Node B (eNB) in a distributed antenna system according to an exemplary embodiment of the present invention.

FIG. 8 is a flowchart illustrating a reference signal measurement procedure of a UE operating in an RI/PMI disabled mode based on reference signal measurement information transmitted by an eNB in a distributed antenna system according to an exemplary embodiment of the present invention.

Referring to FIG. 8, the UE receives the control information on the feedback configuration from the eNB at step 800. According to an exemplary embodiment of the present invention, the control information may include whether the UE is to operate in the RI/PMI disabled mode.

The UE determines whether it is operating in the RI/PMI disabled mode at step 810 and, if it is not operating in the RI/PMI disabled mode (i.e., if it is in the RI/PMI enabled mode), measures CSI-RS to generate RI/PMI/CQI (the second type channel information) to the eNB at step 820.

Otherwise, if it is operating in the RI/PMI disabled mode, the UE determines the reference signal measurement information from the eNB.

More specifically, the UE determines whether the RS_Switch bit is set to 0 at step 830 and, if so, measures CRS to generate CQI at step 840. Otherwise, if the RS_Switch bit is set to 1, the UE measures CSI-RS to generate CQI at step 850.

For reference, the CQI generated, at the UE, based on the reference signal indicated by the eNB is referred to as first type channel information.

Typically, whether to enable or disable the RI/PMI report is determined depending on the network implementation, i.e., whether the system is implemented based on the distributed antenna system. The eNB selects the best RS for the network implementation and notifies the UE of the selected RS using the RS_Switch bit. The RS_Switch bit is transmitted to the UE through a higher layer signaling or a physical layer signaling.

In the case of using the higher layer signaling, the RS_Switch bit can be broadcast in the system information which can be received by all UEs or unicast to a particular UE. In the case of using the physical layer signaling, the RS_Switch bit can be carried by PDCCH or E-PDCCH supported in LTE/LTE-A.

Hereinabove, an exemplary method for indicating the RS to be measured for generating CQI explicitly with the RS_Switch bit has been described.

According to another exemplary embodiment of the present invention, the implicit reference signal type notification method is implemented implicitly with a known control information or system configuration information other than explicit indication information of RS_Switch bit. The implicit reference signal type notification can be accomplished in two ways as follows.

Implicit RS Type Indication Exemplary Method 1

If a specific cell is implemented with the distributed antenna system in the LTE/LTE-A system, interference measurement resource notification is performed to the UE. In the LTE/LTE-A mobile communication system of the related art implemented without application of distributed antenna system, the CRS-based interference measurement is inaccurate and thus, the eNB notifies the UE of interference measurement resource separately.

By taking notice of this feature, the eNB and the UE may negotiate to measure CSI-RS for generating CQI even in the RI/PMI disabled mode if the eNB notifies the UE of interference measurement resource without transmitting extra control information, such as RS_Switch bit.

For example, if the interference measurement resource has been notified to the UE, the UE measures CSI-RS to generate CQI to the eNB such that the eNB transmits PDSCH based on the CQI, even in the RI/PMI disabled mode. Otherwise, if no interference measurement resource has been notified to the UE operating in the RI/PMI disabled mode, the UE measures CRS to generate CQI to the eNB. In this way, the eNB is capable of notifying the UE of the RS to be used for generating CQI without compromising a higher layer signaling overhead.

Implicit RS Type Indication Exemplary Method 2

If a specific cell is implemented with the distributed antenna system in the LTE/LTE-A system, the UE may be configured to perform multiple feedbacks for cooperative communication of the distributed transmission points. Typically, a single feedback means RI/PMI/CQI feedback in the RI/PMI enabled mode or CQI feedback in the RI/PMI disabled mode.

For example, if multiple feedbacks are configured for the UE operating in the RI/PMI disabled state, the UE reports CQIs on the two or more transmission points or interference conditions. By taking notice that multiple feedbacks are configured in the distributed antenna system, the eNB can notify the UE of the RS to be measured with transmitting extra control information, such as RS_Switch bit. For example, if it is configured to feed back multiple CQIs, the UE operating in the RI/PMI disabled mode measures CSI-RS to generate CQI. Otherwise, if it is configured to feedback a single CQI, the UE operating in the RI/PMI disabled mode measures CRS to generate CQI. In this way, the eNB is capable of notifying the UE of the RS to be used for generating CQI without compromising a higher layer signaling overhead.

Another problem which has to be addressed in order for the UE operating in the RI/PMI disabled mode to generate CQI is to determine the precoding scheme to be assumed.

More specifically, if the eNB has instructed to calculate CQI with CSI-RS measurement in the RI/PMI disabled mode, it is necessary to share the precoding scheme for multiple CSI-RS antenna ports between the UE and the eNB. The reason for sharing the precoding scheme is because the UE has to know the precoding scheme to be applied by the eNB in order to receive PDSCH transmitted based on the Modulation and Coding Scheme (MCS) corresponding to the CQI fed back by the UE. The UE can determine the precoding scheme in two methods.

Precoding Scheme Determination Exemplary Method 1

The first exemplary method is to negotiate the precoding scheme to be used between the UE and the eNB.

The precoding scheme may be a precoding matrix indicated by the PMI among plural precoding matrices. For example, the eNB and UE may assume [+0.5 +0.5 +0.5 +0.5]T for four CSI-RS antenna ports. The eNB and the UE also may assume that plural precoding schemes are applied cyclically in a given time or frequency region.

Figure 9:
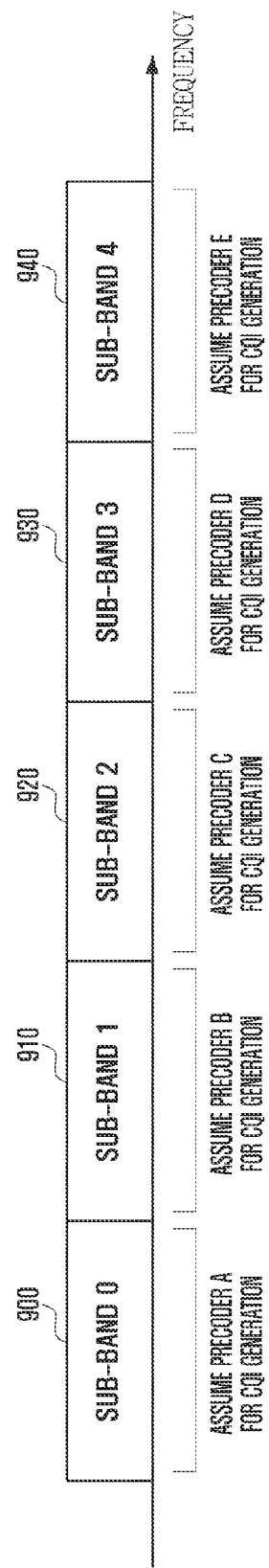
FIG. 9 is a diagram illustrating a cycle of precoding schemes in a frequency domain that may be assumed between a UE and a terminal according to an exemplary embodiment of the present invention.

FIG. 9 is a diagram illustrating a cycle of precoding schemes in a frequency domain that may be assumed between a UE and a terminal according to an exemplary embodiment of the present invention.

Referring to FIG. 9, the UE assumes that the different precoders are applied to sub-bands 0 to 4, 900 to 940, respectively.

The information on the precoding schemes mapped to the respective sub-bands are shared between the eNB and the UE. Accordingly, the UE generates CQI under the assumption of the precodings schemes for the respective sub-bands. This exemplary method of generating CQI under the assumption of multiple pre-coders in the frequency or time domain has diversity gain as compared to the case of using only one precoder. Here, the diversity gain is of preventing an inefficient precoding scheme from being applied continuously by applying multiple precoding schemes cyclically.

With the precoding diversity, it is possible to improve the system throughput. In order to acquire precoding diversity gain in the RI/PMI disabled mode, it is necessary to negotiate a set of precoders and precoder-sub-band mappings between the eNB and the UE.

According to an exemplary embodiment, the eNB may assume a set of pre-negotiated precoders per sub-band index without extra signaling. For example, the precoder to be assumed in generating CQI on certain sub-band is determined by Equation (1):

$$\text{precoder index} = \text{subband index modulo } N_{precoder} \quad \text{Equation (1)}$$

In Equation (1), $N_{precoder}$ denotes a number of precoders to be used for precoder diversity.

Precoding Scheme Determination Exemplary Method 2

The second exemplary method for determining the precoding scheme to be applied by the UE is for eNB to notify the UE of the precoder set through a higher layer signaling such that the UE generates CQI under the assumption of the precoding scheme determined by Equation (1).

Although the description has been directed to the assumption of the cyclic application of precoding schemes in the frequency domain in the first precoding scheme determination method, the precoding schemes can be applied cyclically in the time domain.

Precoding Scheme Determination Exemplary Method 3

Unlike the above described exemplary methods in which the UE generates CQI under the assumption that the precoding schemes included in a candidate precoder set are applied cyclically in the time or frequency domain, the UE can generate CQI under the assumption the precoding schemes of the candidate precoder set are applied cyclically to some REs in a subframe.

Figure 10:
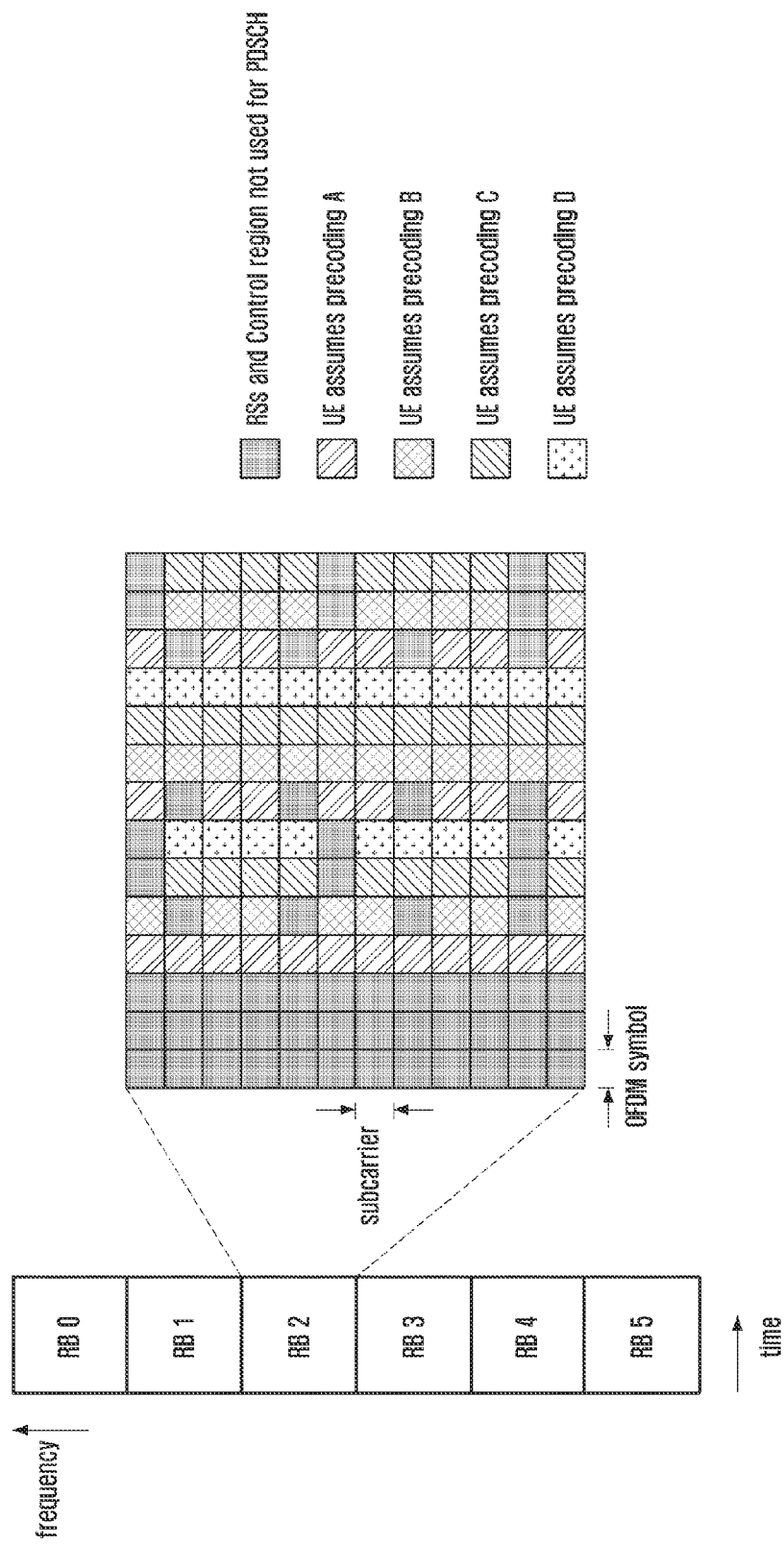
FIG. 10 is a time-frequency grid illustrating a precoding scheme application pattern in a Resource Block (RB) according to an exemplary embodiment of the present invention.

FIG. 10 is a time-frequency grid illustrating a precoding scheme application pattern in an RB according to an exemplary embodiment of the present invention.

Referring to FIG. 10, the UE is capable of generating CQI under the assumption that the precoders are cyclically applied to the OFDM symbols. Although FIG. 10 is directed to the case where precoders are applied to the OFDM symbols cyclically, the precoders may be applied in such a way of sorting the REs of the RB into plural groups and mapping the precoders to the groups in a certain pattern.

In the exemplary precoding scheme determination method 3, the precoding scheme determines by per RE in the precoder set preconfigured or notified by the eNB using a method similar to that of Equation (1).

In addition to the exemplary precoding scheme determination method 1, 2, and 3, it is possible for the UE to generate CQI under the assumption of Space Time/Frequency Block Code per RE. The method for generation CQI under assumption of Space Time/Frequency Block Code is described hereinafter.

Precoding Scheme Determination Exemplary Method 4

In the method for generating CQI under the assumption of Space Time/Frequency Block Code, the UE generates CQI under the assumption of the coding scheme defined for use in time, frequency, and antenna domains. With the Space Time/Frequency Block Code, it is possible to expect average gain of plural radio channels.

In the current LTE/LTE-A system, two types of Space Time/Frequency Block Code represented by Equation (2) and Equation (3) can be applied selectively depending on the number of transmit antennas. For two transmit antennas, the Space Time/Frequency Block Code of Equation (2) is applied.

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \quad \text{Equation (2)}$$

In Equation (2), y denotes the encoded signal, and x denotes the signal input to the encoder. In addition, i denotes the index indicating the order of the signal input to the encoder. Re(z) denotes the real component of complex number Z, and Im(Z) denotes the imaginary component of the complex number Z. In x(k)(i) and y(k)(i), k denotes the antenna port index.

For four transmit antennas, the Space Time/Frequency Block Code of Equation (3) is applied.

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \text{Re}(x^{(0)}(i)) \\ \text{Re}(x^{(1)}(i)) \\ \text{Re}(x^{(2)}(i)) \\ \text{Re}(x^{(3)}(i)) \\ \text{Im}(x^{(0)}(i)) \\ \text{Im}(x^{(1)}(i)) \\ \text{Im}(x^{(2)}(i)) \\ \text{Im}(x^{(3)}(i)) \end{bmatrix} \quad \text{Equation (3)}$$

In the LTE/LTE-A system, the problem is that the Space Time/Frequency Block Codes are defined for the cases of using two transmit antennas and four transmit antennas as in Equation (2) and Equation (3). There is therefore a need for a method of generating CQI under the assumption of a Space Time/Frequency Block Code for the case of using eight CSI-RS transmit antenna ports.

In order to generate CQI under the assumption of a Space Time/Frequency Block Code for the case of using 8 CSI-RS antenna ports, an exemplary embodiment of the present invention proposes an antenna virtualization method of the UE.

For example, if the number of Space Time/Frequency Block Codes is less than the number of multi-antenna modes, the UE is capable of aggregating CSI-RSs appropriate for the corresponding Space Time/Frequency Block Code through antenna virtualization.

For example, the UE is capable of assuming the Space Time/Frequency Block Code of Equation (2) for the two transmit antenna mode with 8 CSI-RS antenna ports. In this case, receives CSI-RSs from 8 transmit antenna ports and performs antenna virtualization so as to be regarded as CSI-RSs received from 2 transmit antennas. The UE's antenna virtualization can be accomplished by combining the CSI-RSs in a predefined rule. For example, when the signals are received from the CSI-RS antenna ports 1, 2, 3, 4, 5, 6, 7, and 9, the UE may combine the signals received from the CSI-RS antenna ports 1, 2, 3, and 4 into the CSI-RS for transmit antenna 1 and the signals received from the CSI-RS antenna ports 5, 6, 7, and 8 into the CSI-RS for transmit antenna 2. In this case, the UE is capable of generating CQI under the assumption of the Space Time/Frequency Block Code of Equation (2).

It is also possible to combining the signals received from the CSI-RS antenna ports 1, 3, 5, and 7 into the CSI-RS for the transmit antenna 1, and the signals received from the CSI-RS antenna ports 2, 4, 6, and 8 into the CSI-RS for the transmit antenna 2, according to the negotiation between the UE and the eNB.

It is also possible to multiply a constant value negotiated between the UE and the eNB with the per-antenna signal before combining the respective antenna signals.

Figure 13:
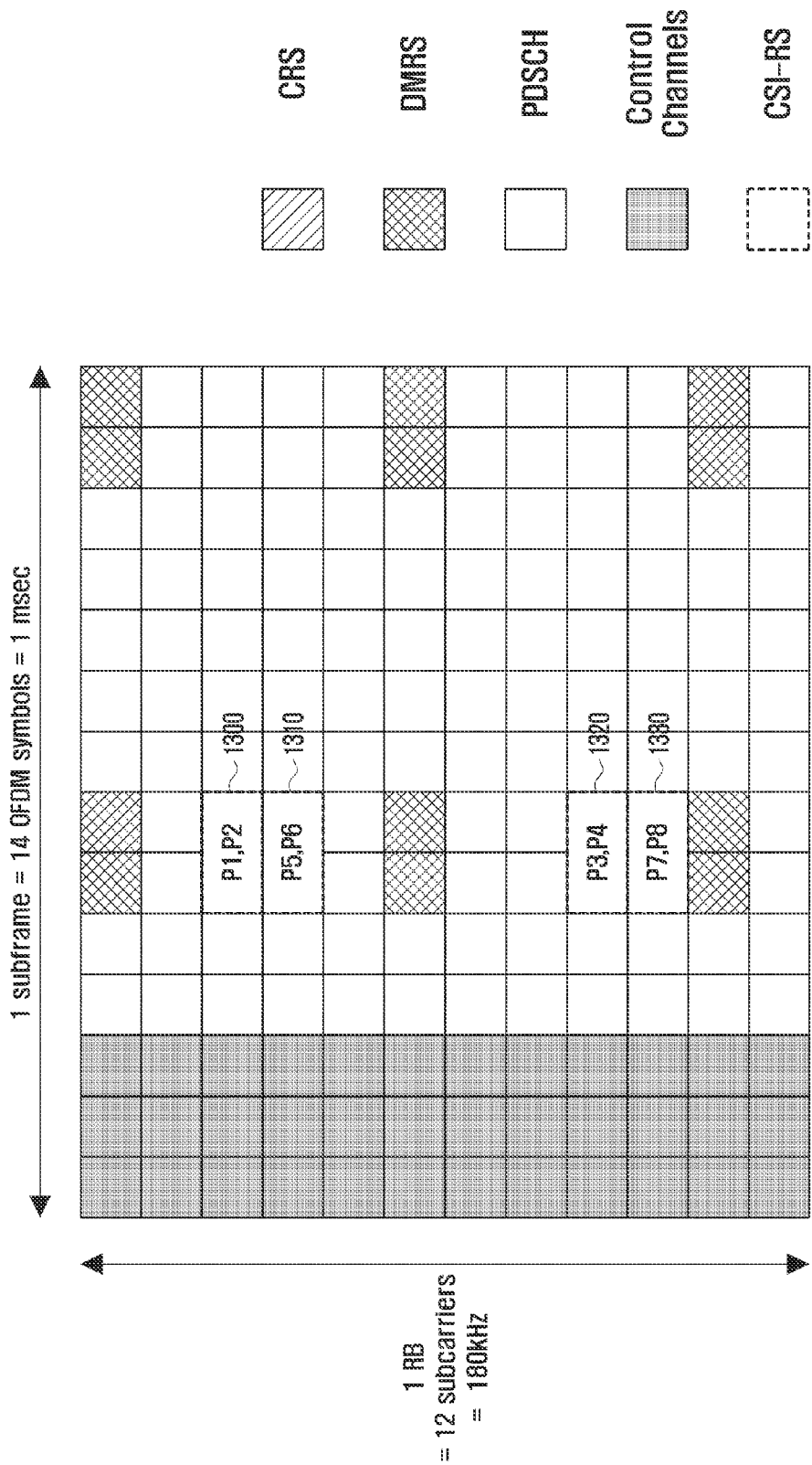
FIG. 13 is a time-frequency grid illustrating an antenna virtualization in an RB for applying Space Time/Frequency Block Code according to an exemplary embodiment of the present invention.

FIG. 13 is a time-frequency grid illustrating an antenna virtualization in an RB for applying Space Time/Frequency Block Code according to an exemplary embodiment of the present invention.

Referring to FIG. 13, the UE receives CSI-RSs transmitted from 8 antenna ports at the RE positions 1300 (P1 and P2), 1310 (P5 and P6), 1320 (P3 and P4) and 1330 (P7 and P8).

Assuming that the Space Time/Frequency Block Code support two transmit antenna modes, the UE performs antenna virtualization on the CSI-RSs transmitted from the 8 antenna ports to generate two CSI-RSs corresponding to two transmit antennas. For example, the CSI-RSs transmitted at the RE positions 1300, 1310, 1320, and 1330 are combined into the two signals as if they have been transmitted from two transmit antennas according to a certain rule.

In order to convert the 8 antenna port CSI-RSs to two antenna port CSI-RSs, it may be considered to combine the signals by OFDM symbol. By combining the signals mapped to the resource positions 1300, 1310, 1320, and 1330 in this way, it is possible to acquire the signals mapped to two REs and thus generate two transmit antenna signals by correlating the combined signals with the orthogonal codes used for distinguishing between the transmit antenna ports.

Assuming that the Space Time/Frequency Block Code supports four transmit antenna mode, the UE performs antenna virtualization on the CSI-RSs transmitted from the 8 antenna ports to generate four CSI-RSs corresponding to four transmit antennas. For example, the CSI-RSs transmitted at the RE positions 1300, 1310, 1320, and 1330 are combined into four signals as if they have been transmitted from four transmit antennas according to a certain rule.

In order to convert the 8 antenna port CSI-RSs to four antenna port CSI-RSs, it may be considered to combine the signals by pairing CSI-RSs. In order to combine the signals mapped to the resource positions 1300, 1310, 1320, and 1330 in this way, it is necessary to negotiate the pairs to be combined between the eNB and the UE. For example, if it is negotiated to combine the signals mapped to the resource positions 1300 and 1320 and the resource positions 1310 and 1330 between the UE and the eNB, the UE has to combine the signals according to this negotiated rule always.

Figure 11:
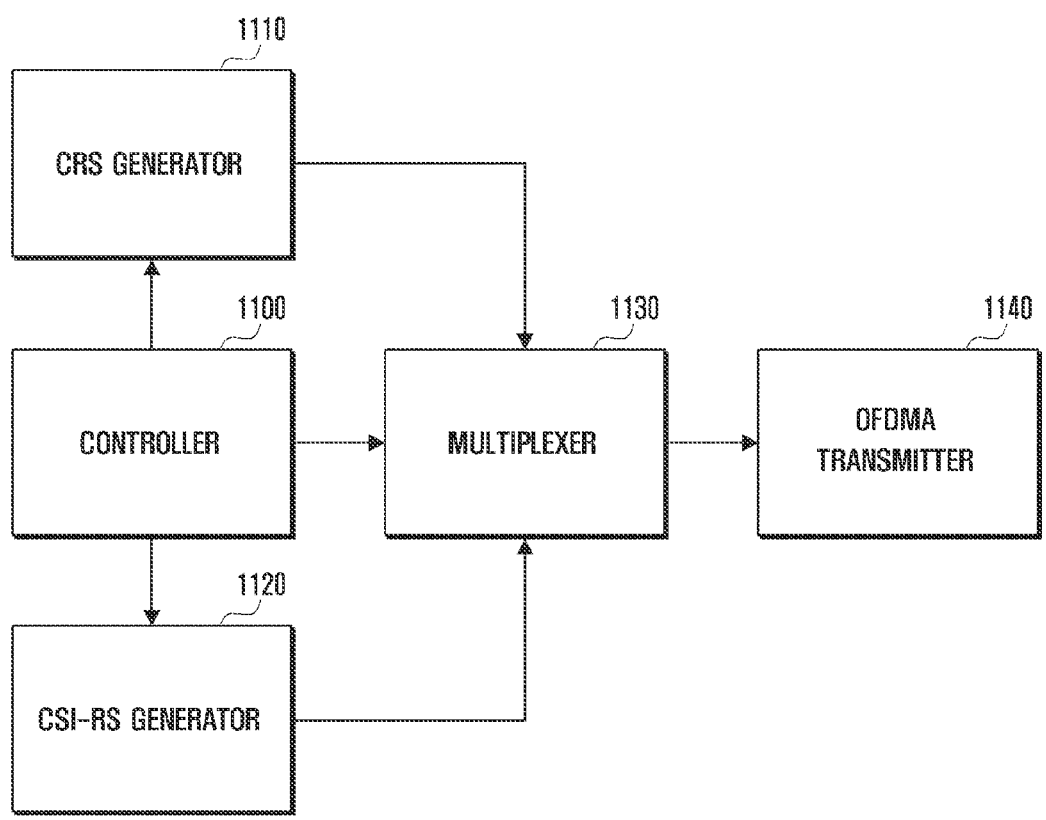
FIG. 11 is a block diagram illustrating a configuration of an eNB according to an exemplary embodiment of the present invention.

FIG. 11 is a block diagram illustrating a configuration of an eNB according to an exemplary embodiment of the present invention.

Referring to FIG. 11, a controller 1100 of the eNB determines the following:

Notify the UE of whether to operate in RI/PMI disabled mode and configuration information thereon, Notify the UE of reference signal for the UE to measure between CRS and CSI-RS in RI/PMI disabled mode and configuration information thereon, and Notify the UE of precoding scheme to be assumed for generating CQI in frequency and time domains in RI/PMI disabled mode.

If the determination has completed, the controller 1100 generates transmission signal including information on whether RI/PMI mode configuration, RS to be used, and precoding set to be used. The transmission signal generated by the controller 1100 is multiplexed with the signals generated by the CRS generator 1110 and the CSI-RS generator 1120 at the multiplexer 1130 in the frequency or time domain and transmitted by means of the OFDM signal generator 1140.

In brief, the controller 1100 determines whether the UE is operating in the RI/PMI disabled mode, determines the reference signal for the UE to measure in the RI/PMI disabled mode between CRS and CSI-RS, notifies the UE of the determined reference signal, receives the first type channel information generated based on the notified reference signal from the UE, and controls data transmission to the UE based on the first type channel information.

If it is determined that the UE is operating in the RI/PMI enabled mode, the controller 1100 notifies the UE of CSI-RS as the reference signal to be measured, receives the second type channel information generated based on the CSI-RS measurement from the UE, and controls data transmission to the UE based on the second type channel information.

According to an exemplary embodiment of the present invention, the controller 1100 is capable of notifying the UE of the reference signal to be measured explicitly using reference signal measurement information in the form of one bit indicator. In this case, the controller 1100 is capable of transmitting the reference signal measurement information to the UE through a higher layer signaling or a physical layer signaling.

According to another exemplary embodiment of the present invention, the controller 1100 may control to notify the UE of interference measurement resource or multiple feedbacks mode and receive the third type channel information based on CSI-RS measurement from the UE. This is an exemplary method of notifying the UE of the reference signal to be measured implicitly.

The controller 1100 is also capable of controlling to transmit data coded with a specific precoder. In this case, the precoder may be predefined in a candidate precoder set or to be determined according to the sub-band.

Figure 12:
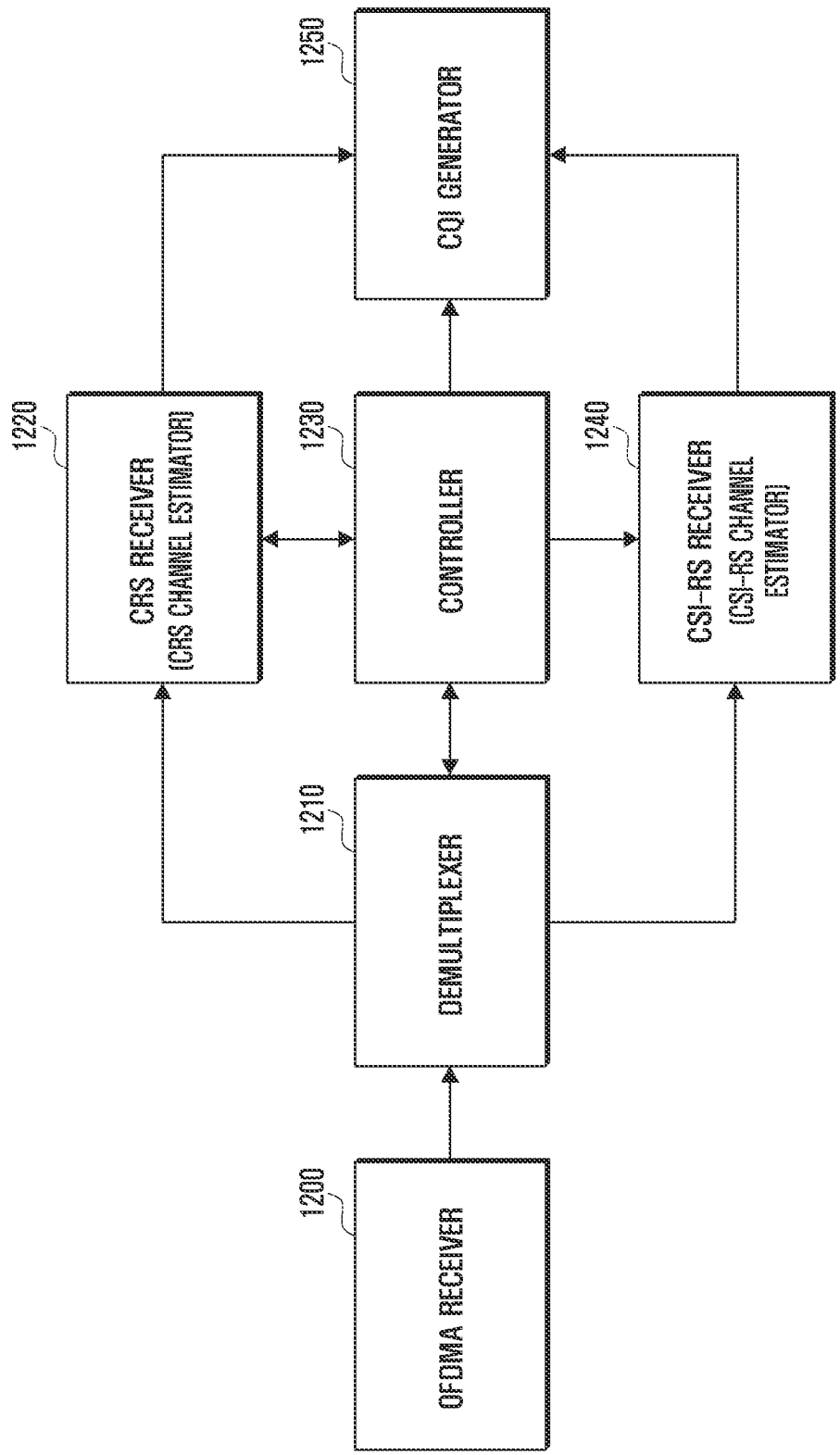
FIG. 12 is a block diagram illustrating a configuration of a UE according to an exemplary embodiment of the present invention.

FIG. 12 is a block diagram illustrating a configuration of a UE according to an exemplary embodiment of the present invention.

Referring to FIG. 12, the UE receives a radio signal from the eNB by means of the OFDMA receiver 1200. The received signal is demultiplexed by the demultiplexer 1210, and the demultiplexed RI/PMI configuration information is delivered to the controller 1230.

The controller 1230 determines the RS to measure according to the configuration information in the RI/PMI disabled mode. In the RI/PMI disabled mode, the CQI generator 1250 generates CQI based on the CSI-RS measured by the CSI-RS receiver 1240 under the assumption of an appropriate precoding or the CRS measured by the CRS receiver 1220 under the control of the controller 1230. In the RI/PMI enabled mode, the CQI generator 1250 generates CQI based on the CSI-RS measured by the CSI-RS receiver 1240 under the control of the controller 1230.

In brief, the controller 1230 receives the information on RI/PMI disabled mode information from the eNB and receives, when the information indicates the RI/PMI disabled mode, reference signal to be measured in the RI/PMI disabled mode. The controller 1230 measures the determined reference signal to generate the first type channel information to the eNB. The controller 1230 controls receiving data transmitted by the eNB based on the first type channel information.

The controller 1230 controls to measure CSI-RS to generate the second type channel information to the eNB in the RI/PMI enabled mode.

According to an exemplary embodiment of the present invention, the controller 1230 is capable of receiving the reference signal measurement information indicating the reference signal to be measured explicitly in the form of one bit indicator. In this case, the reference signal measurement information can be received through a higher layer signaling or a physical layer signaling.

According to another exemplary embodiment of the present invention, when interference measurement resource or multiple feedbacks mode is notified by the eNB, the controller 1230 regards this as the CSI-RS measure indication implicitly and thus, measures CSI-RS to generate the third type channel information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a terminal in a mobile communication system, the method comprising:
   receiving information on a rank indicator/precoding matrix indicator (RI/PMI) disabled mode for the terminal from a base station;
   determining whether configuration information on measuring the channel is received;
   identifying a reference signal for measuring the channel between a cell-specific reference signal (CRS) and a channel status information reference signal (CSI-RS) based on a result of the determination; and
   generating channel information based on the identified reference signal.

2. The method of claim 1, wherein the configuration information comprises interference measurement resource information.

3. The method of claim 2, wherein the generating of the channel information comprises:
   generating the channel information based on the CSI-RS if the interference measurement resource information is received.

4. The method of claim 2, wherein the generating of the channel information comprises:
   generating the channel information based on the CRS if the interference measurement resource information is not received.

5. The method of claim 2, wherein the interference measurement resource information corresponds to a transmission mode of the terminal.

6. A method for a base station in a mobile communication system, the method comprising:
   transmitting information on a rank indicator/precoding matrix indicator (RI/PMI) disabled mode for a terminal to the terminal;
   determining whether to transmit configuration information on measuring the channel to the terminal; and
   receiving channel information generated based on a result of the determination from the terminal.

7. The method of claim 6, wherein the configuration information comprises interference measurement resource information.

8. The method of claim 7, the receiving of the channel information comprises:
   receiving the channel information generated based on the CSI-RS if the interference measurement resource information is transmitted.

9. The method of claim 7, the receiving of the channel information comprises:
   receiving the channel information generated based on the CRS if the interference measurement resource information is not transmitted.

10. The method of claim 6, wherein the interference measurement resource information corresponds to a transmission mode of the terminal.

11. A terminal in a mobile communication system, the terminal comprising:
    a transceiver configured to transmit and receive a signal; and
    a controller configured:
       to receive information on a rank indicator/precoding matrix indicator (RI/PMI) disabled mode for the terminal from a base station,
       to determine whether configuration information on measuring the channel is received,
       to identify a reference signal for measuring the channel between a cell-specific reference signal (CRS) and a channel status information reference signal (CSI-RS) based on a result of the determination, and
       to generate channel information based on the identified reference signal.

12. The terminal of claim 11, wherein the configuration information comprises interference measurement resource information.

13. The terminal of claim 12, wherein the controller is further configured to generate the channel information based on the CSI-RS if the interference measurement resource information is received.

14. The terminal of claim 12, wherein the controller is further configured to generate the channel information based on the CRS if the interference measurement resource information is not received.

15. The terminal of claim 12, wherein the interference measurement resource information corresponds to a transmission mode of the terminal.

16. A base station in a mobile communication system, the base station comprising:
- a transceiver configured to transmit and receive a signal; and
- a controller configured:
  - to transmit information on a rank indicator/precoding matrix indicator (RI/PMI) disabled mode for a terminal to the terminal,
  - to determine whether to transmit configuration information on measuring the channel to the terminal, and
  - to receive channel information generated based on a result of the determination from the terminal.

17. The base station of claim 16, wherein the configuration information comprises interference measurement resource information.

18. The base station of claim 17, wherein the controller is further configured to receive the channel information generated based on the CSI-RS if the interference measurement resource information is transmitted.

19. The base station of claim 17, wherein the controller is further configured to receive the channel information generated based on the CRS if the interference measurement resource information is not transmitted.

20. The base station of claim 16, wherein the interference measurement resource information corresponds to a transmission mode of the terminal.

\* \* \* \* \*